(12) United States Patent
Schultink

(10) Patent No.: US 9,836,203 B2
(45) Date of Patent: Dec. 5, 2017

(54) GRID-BASED VISUAL DESIGN ENVIRONMENT

(71) Applicant: Axiom One Ltd., Tel Aviv (IL)

(72) Inventor: Jan Schultink, Tel Aviv (IL)

(73) Assignee: Axiom One Ltd., Tel Aviv (IL)

( * ) Notice: Subject to any disclaimer, the term of this patent is extended or adjusted under 35 U.S.C. 154(b) by 242 days.

(21) Appl. No.: 14/745,867

(22) Filed: Jun. 22, 2015

(65) Prior Publication Data

US 2016/0026376 A1 Jan. 28, 2016

Related U.S. Application Data

(60) Provisional application No. 62/029,105, filed on Jul. 25, 2014.

(51) Int. Cl.
| | |
|---|---|
| *G06F 3/00* | (2006.01) |
| *G06F 17/00* | (2006.01) |
| *G06F 3/0484* | (2013.01) |
| *G06F 3/0482* | (2013.01) |
| *G06F 17/21* | (2006.01) |
| *G06F 9/44* | (2006.01) |

(52) U.S. Cl.
CPC ........ *G06F 3/04847* (2013.01); *G06F 3/0482* (2013.01); *G06F 3/04842* (2013.01); *G06F 3/04845* (2013.01); *G06F 9/4443* (2013.01); *G06F 17/21* (2013.01); *G06F 2203/04803* (2013.01)

(58) Field of Classification Search
CPC ........ G06F 17/246; G06F 15/00; G06F 17/00; G06G 5/00
See application file for complete search history.

(56) References Cited

U.S. PATENT DOCUMENTS

| | | | |
|---|---|---|---|
| 5,601,436 A | 2/1997 | Sudman et al. | |
| 6,057,837 A | * 5/2000 | Hatakeda | G06F 17/246 |
| | | | 715/708 |
| 6,195,092 B1 | 2/2001 | Dhond et al. | |

(Continued)

OTHER PUBLICATIONS

'blogs.office.com' [online]. "PowerPoint 2013: Smarter Guides," Nov. 9, 2012, [retrieved Jun. 25, 2015]. Retrieved from the Internet: URL<https://blogs.office.com/2012/11/09/powerpoint-2013-smarter-guides/>. 4 pages.

(Continued)

*Primary Examiner* — Jennifer To
*Assistant Examiner* — Jasmine Wan
(74) *Attorney, Agent, or Firm* — Fish & Richardson P.C.

(57) ABSTRACT

In general, the subject matter described in this disclosure can be embodied in methods, systems, and computer-readable devices for presenting, by a computing system, multiple cells that are arranged in a multi-dimensional grid of cells. The computing system may display content in a first cell without displaying the content in a second cell. The computing system may present a first user interface element that is to expand the display of the content from the first cell to both the first cell and the second cell. The computing system may receive first user input that selects the first user interface element. The computing system may display, in response to receiving the first user input, the content in the first cell and the second cell.

16 Claims, 12 Drawing Sheets

(56) References Cited

U.S. PATENT DOCUMENTS

| | | | | |
|---|---|---|---|---|
| 6,621,532 | B1* | 9/2003 | Mandt | G06F 3/0482 348/841 |
| 6,988,241 | B1* | 1/2006 | Guttman | G06F 17/246 707/E17.115 |
| 7,164,410 | B2* | 1/2007 | Kupka | G06F 3/0231 345/156 |
| 7,403,211 | B2* | 7/2008 | Sheasby | G06T 11/60 345/660 |
| 7,428,704 | B2 | 9/2008 | Baker et al. | |
| 8,429,519 | B2 | 4/2013 | Parks et al. | |
| 8,799,774 | B2 | 8/2014 | Chafy et al. | |
| 2002/0191013 | A1* | 12/2002 | Abrams | G06F 9/543 715/730 |
| 2003/0177448 | A1* | 9/2003 | Levine | H04N 1/00127 715/201 |
| 2004/0103366 | A1* | 5/2004 | Peyton-Jones | G06F 17/246 715/213 |
| 2004/0103369 | A1* | 5/2004 | Robertson | G06F 17/245 715/234 |
| 2005/0172242 | A1* | 8/2005 | Vienneau | G06F 8/38 715/801 |
| 2006/0156254 | A1* | 7/2006 | Satake | G09G 5/00 715/838 |
| 2007/0196033 | A1* | 8/2007 | Russo | G06F 17/30525 382/305 |
| 2008/0256450 | A1* | 10/2008 | Takakura | G06F 17/30064 715/721 |
| 2012/0113036 | A1* | 5/2012 | Lee | G06F 3/0482 345/173 |
| 2012/0185761 | A1* | 7/2012 | Adepalli | G06F 3/04886 715/227 |
| 2013/0239049 | A1* | 9/2013 | Perrodin | G06F 3/0481 715/800 |
| 2014/0208213 | A1 | 7/2014 | DeLuca et al. | |

OTHER PUBLICATIONS

'cit.duke.edu' [online]. "Prezi: Making presentations zoom, flip and move," May 3, 2009, [retrieved Jun. 25, 2015]. Retrieved from the Internet: URL<https://cit.duke.edu/blog/2009/05/prezi/>. 3 pages.

'en.wikipedia.org' [online]. "Prezi," May 27, 2015, [retrieved Jun. 25, 2015]. Retrieved from the Internet: URL<https://en.wikipedia.org/wiki/Prezi>. 5 pages.

'prezi.com' [online]. "Be a Great Presenter," 2015, [retrieved Jun. 25, 2015]. Retrieved from the Internet: URL<https://prezi.com/>. 5 pages.

'products.office.com' [online]. "PowerPoint," 2015, [retrieved Jun. 25, 2015]. Retrieved from the Internet: URL<https://products.office.com/en-us/powerpoint>. 5 pages.

'support.office.com' [online]. "Create a SmartArt graphic," 2015, [retrieved Jun. 25, 2015]. Retrieved from the Internet: URL<https://support.office.com/en-us/article/Create-a-SmartArt-graphic-4c36e284-2b76-400d-99d7-6cf198a33a4b>. 6 pages.

'support.office.com' [online]. "Display and use gridlines and guides," 2015, [retrieved Jun. 25, 2015]. Retrieved from the Internet: URL<https://support.office.com/en-za/article/Display-and-use-gridlines-and-guides-786b4958-199a-40f9-b17b-01b85084bd5e>. 3 pages.

'www.apple.com' [online]. "Keynote for Mac," 2015, [retrieved Jun. 25, 2015]. Retrieved from the Internet: URL<https://www.apple.com/mac/keynote/>. 7 pages.

'www.google.com' [online]. "Google Slides," 2015, [retrieved Jun. 25, 2015]. Retrieved from the Internet: URL<https://www.google.com/slides/about/>. 7 pages.

'www.haikudeck.com' [online]. "Our Story," 2015, [retrieved Jun. 25, 2015]. Retrieved from the Internet: URL<https://www.haikudeck.com/about>. 7 pages.

'www.maclife.com' [online]. "Haiku Deck Review," Mar. 15, 2013, [retrieved Jun. 25, 2015]. Retrieved from the Internet: URL<http://www.maclife.com/article/reviews/haiku_deck_review>. 4 pages.

'www.macworld.co.uk' [online]. "Keynote 6.5 for Mac review: Apple's presentation powerhouse now twinned with iCloud Drive performance," Nov. 7, 2014, [retrieved Jun. 25, 2015]. Retrieved from the Internet: URL<http://www.macworld.co.uk/review/office-software/apple-keynote-60-review-3476759/>. 15 pages.

'www.macworld.com' [online]. "Review: Haiku Deck for iPad takes the work out of building a slideshow presentation," Jun. 3, 2013, [retrieved Jun. 25, 2015]. Retrieved from the Internet: URL<http://www.macworld.com/article/2040498/review-haiku-deck-for-ipad-takes-the-work-out-of-building-a-slideshow-presentation.html>. 6 pages.

'www.pcmag.com/' [online]. "Apple Keynote (for Mac)," Mar. 10, 2015, [retrieved Jun. 25, 2015]. Retrieved from the Internet: URL<http://www.pcmag.com/article2/0,2817,2477675,00.asp>. 5 pages.

'www.pcworld.com' [online]. "Review: Collaborate on presentations with Google Slides," May 29, 2013, [retrieved Jun. 25, 2015]. Retrieved from the Internet: URL<http://www.pcworld.com/article/2039791/review-collaborate-on-presentations-with-google-slides.html>. 5 pages.

'www.techradar.com' [online]. "Microsoft Office 2013 review," Jun. 10, 2015, [retrieved Jun. 25, 2015]. Retrieved from the Internet: URL<http://www.techradar.com/reviews/pc-mac/software/business-and-finance-software/microsoft-office-2013-1089108/review/4>. 18 pages.

* cited by examiner

GRID-BASED VISUAL DESIGN ENVIRONMENT

CROSS REFERENCE TO RELATED APPLICATIONS

This application claims the benefit of priority under 35 U.S.C. §119(e) to U.S. Application No. 62/029,105 filed Jul. 25, 2014. The prior application is incorporated herein by reference in its entirety.

TECHNICAL FIELD

This document relates to generating a user interface.

BACKGROUND

Some application programs enable a user to design a user interface. For example, an application program can allow a user to create multiple slides for a presentation. For each slide, the application program can allow a user to place text in a user-selected area of a slide, and images or other multimedia content in other user-selected areas of the slide. The text and images can be dragged around the slide by user input, for example, with a mouse or stylus. The presentation may later be shown in a presentation mode, in which the location and content of the text and images of each slide may not be editable, and in which a computer may progress a display of the presentation from slide to slide automatically or in response to user input.

SUMMARY

This document describes techniques, methods, systems, and other mechanisms for generating a user interface. Particular implementations can, in certain instances, realize one or more of the following advantages. Users can design presentations more quickly. The design interface may be simpler than traditional design software. A design quality of presentations may be improved. Through use of the technology described within this document, an individual without extensive training in design may be able to create professional-grade, grid-based layouts.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes technology for generating a user interface. The technology may limit an ability of items in a presentation to be moved around, and may prevent images from being distorted or not aligned with other images or objects in the presentation. Rather, the technology may provide guidance for grid-based positioning, and may limit an amount of features and functions provided to a user. The technology may enable a user to expand and contract an area within which content is displayed within multi-dimensional grid of cells (e.g., a 2×2 or 3×2 grid of cells).

Figure 1:
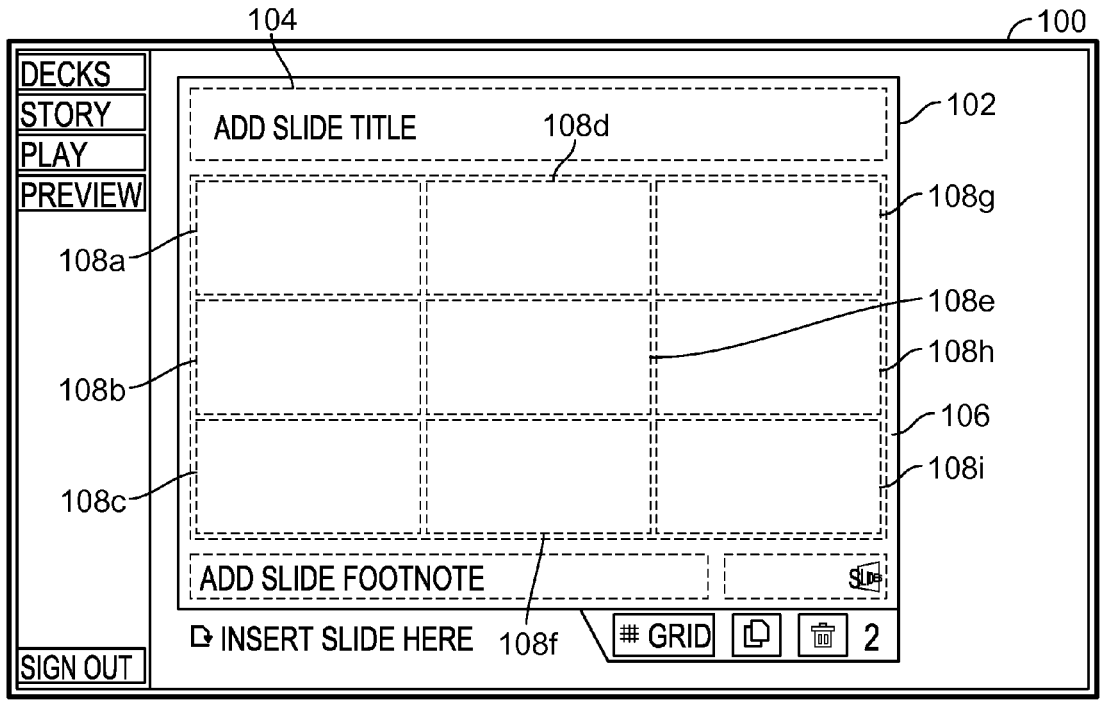
FIGS. 1-18 show screens with which a user can create a user interface.

FIG. 1 shows a user interface 100 for designing a slide of a presentation. The user interface 100 includes a design area 102, which illustrates a slide that is to be presented as part of a presentation and that is editable by user input. The design area 102 includes a slide title region 104. A user may select the title region 104 with user input (e.g., by clicking on the title region 104 with a mouse or pressing the title region 104 on a region of a touchscreen) to enable a user to type characters into the title area 104 with a virtual or physical keyboard.

The user interface 100 also includes a design grid 106 (e.g., a 3×3 grid of cells 108*a-i*) in which additional slide elements may fit. User input can select a cell (e.g., through a touchscreen, mouse, or keyboard selection of a region at which the cell is being displayed on a display device). In response to user selection of the cell, the computing system may highlight the display of the cell to indicate that the cell has been selected. For example, a border of the cell may change color or a thick border around the cell may be presented or may change in color or shading. An interior of the cell may also be highlighted in a similar manner. Additionally or alternatively, a set of user interface elements with which the user can provide input to modify a content of the cell can appear.

Figure 2:
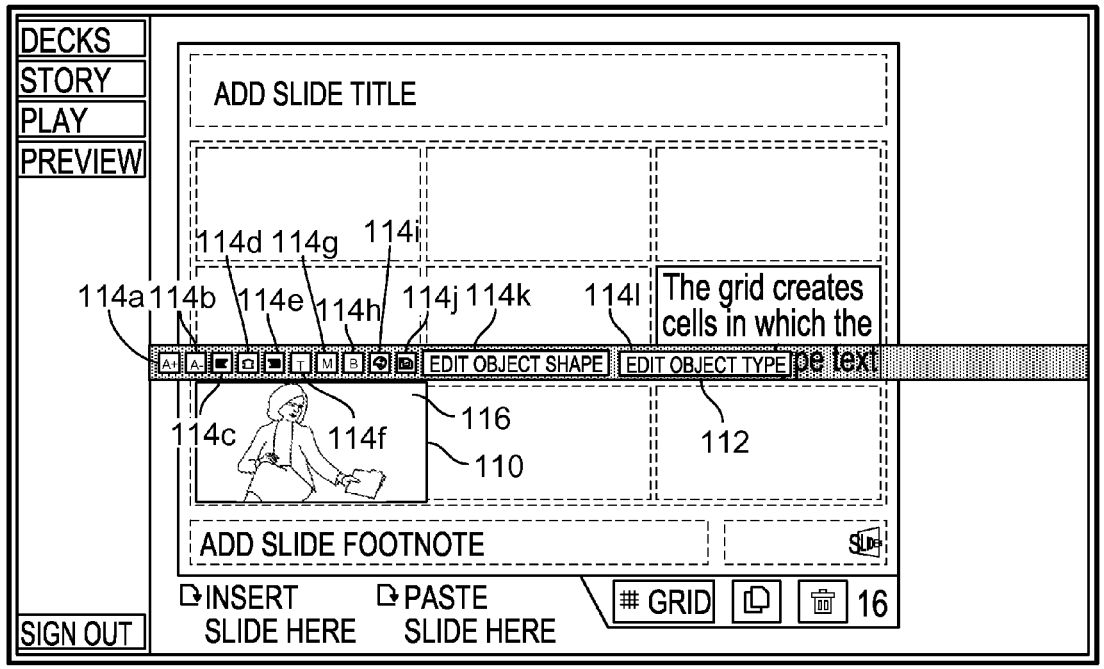

As an illustration, FIG. 2 shows an example display after user input has selected cell 108*c* (and also added content to cell 108*c* and 108*h*). In response to the user selection, a border 110 appears around the cell 108*c*, and the bar 112 appears above the selected cell 108*c*. The bar 112 includes the above-described set of user interface elements with which the user can provide input to modify a content of the cell. A location of the set of user interface elements (e.g., the bar 112) may depend on a location of the cell that is selected. For example, the same set of user interface elements may appear in response to user selection of any of multiple cells, but the location of the interface elements may be different based on the cell that is selected. In some examples the user interface elements may be displayed in the bar 110, and the bar 110 may abut a top of the selected cell. In other examples, the user interface elements may not be displayed in the bar 110.

Each of the user interface elements in the set may be associated with a function that is invoked upon user selection of the respective user interface element. The various functions include, for example, (a) increase text size (see element 114*a*, which displays "A+"), (b) decrease text size (see element 114*b*, which displays "A−"), (c) align text to the left (see element 114*c*), (d) center text (see element 114*d*), (e) align text to the right (see element 114*e*), (f) align text at top (see element 114*f*, which displays a "T"), (g) align text at middle (see element 114*g*, which shows a "M"), (h) align text at bottom (see element 114*h*, which shows a "B"), (i) add color (see element 114*i*), (j) insert image (see element 114*j*), (k) edit object shape (see element 114*k*), and (l) edit object type (see element 114*l*).

Through interaction with element 114*j* in bar 112, a user may insert an image into the selected cell. For example, in response to user input that selects element 114*j*, a dialog box may appear with which a user is able to specify a location—on a local storage drive or on the internet—of an image that is be placed within the area defined by the border of cell 108c. In FIG. 2, a user has already selected an image 116 to appear in cell 108c.

Similarly, a user has previously selected cell 108h and inserted the phrase "The grid creates cells in which the user can type text," by typing the same using a virtual or physical keyboard. The user may not have had to select any element in bar 112 to insert the text into the cell. Rather, the user may simply select the cell and then type the phrase once the cell is selected. Additionally or alternatively, the user may select an element in bar 112 to invoke a text entry mode. In this example, the typed text is centered in the cell and has a middle vertical positioning in the cell. Thus, the user may have selected elements 114d and 114g after or before the text was typed into the cell, in order to set text positioning settings for the cell (assuming that the default text alignment was different).

Figure 3:
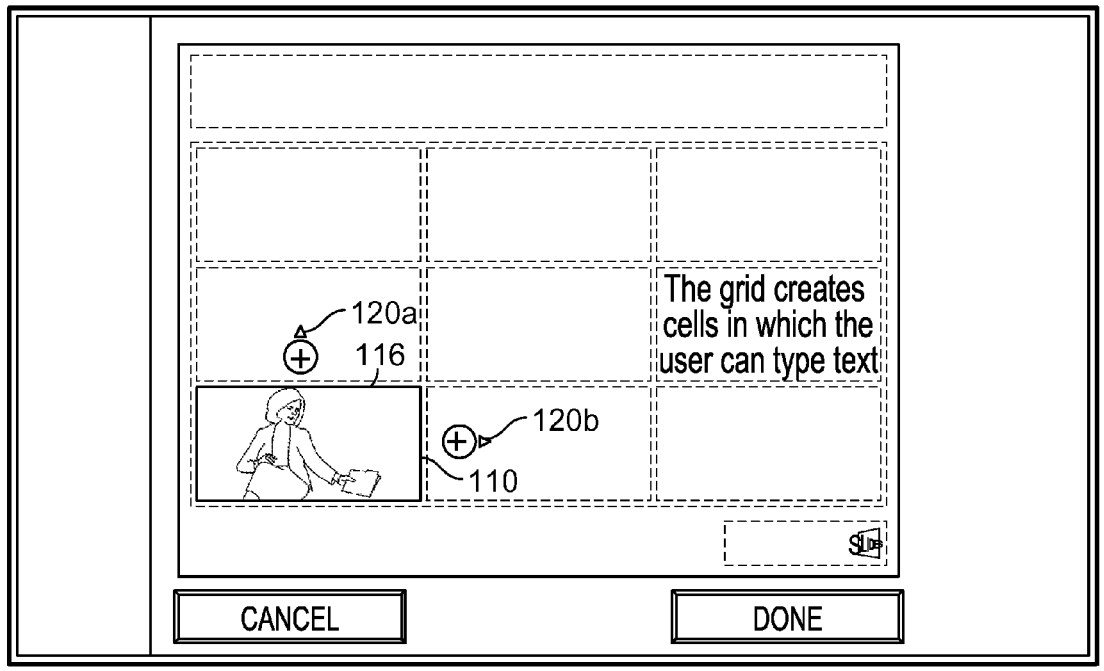

FIG. 3 shows a display of the user interface generating application program after user selection of the "Edit Object Shape" user interface element 114k (FIG. 2). Selection of element 114k causes the computing system to present user interface elements 120a and 120b for expanding the content that is displayed in the cell from being presented in one cell to being presented in multiple cells. For example, user selection of element 120a may cause the image 116 to be presented in both of cells 108b and 108c (see FIG. 1), and user selection of element 120b may cause the image 116 to be presented in both of cells 108c and 108f (see FIG. 1). User selection of both elements 120a and 120b may cause the image 116 to be presented in all four of cells 108b, c, e, and f. The expansion of the image 116 to multiple cells may occur through user selection of one or more of elements 120a-b (e.g., through click, or click and drag, press, or press and drag selections of the "+" user interface elements 120a-b). In this description, the cells are referred to as fixed locations on the display into which content can appear, even though this technology could also be described as allow a user to change a size of the cells and the content therein. In various implementations, expanding the display of content from one cell to multiple cells may appear as though the original cell is changing in size.

Figure 4:
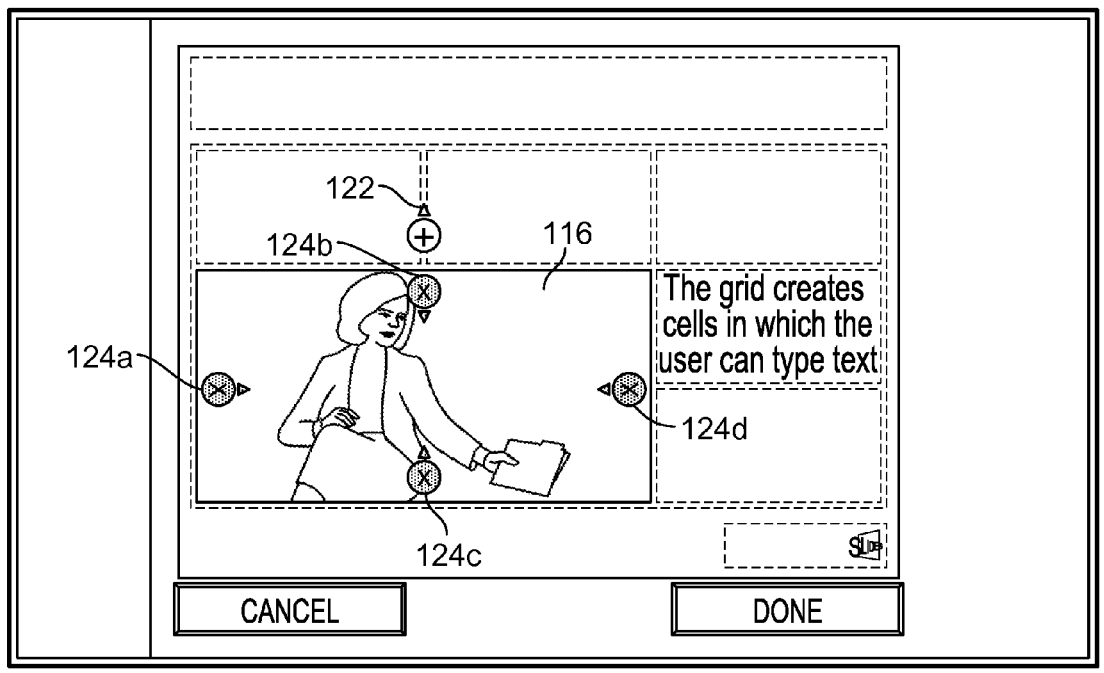

FIG. 4 shows a display as a result of a user having selected the "+" user interface element 120b to the right of the selected cell (e.g., and dragged that interface element 120b one cell width to the right). The user did the same with the "+" user interface element 120a at the top of cell 108c to expand the image display region one cell length higher. In some examples, the resizing of the image display region may be limited to increments of full cells in the grid, such that an image display region can be expanded to occupy the area covered by multiple other contiguous cells (but possibly only in whole-cell increments).

After the image 116 has expanded to fill the area of cells 108b, c, e, and f, the computing system may display element 122 and 124a-d. As shown in FIG. 4, element 122, which includes a plus sign and an outward-facing arrow, may appear on the exterior of image 114. Elements 124a-d, which may each include an "X" sign and an inward-facing arrow, may appear on the interior of the displayed region of the image 114 and border 110.

Interface element 122 may invoke a function similar to that of elements 120a and 120b, in that it causes expansion of the display area of the image, for example, by expanding the display area for image 116 to all of cells 108a-f upon selection of element 122. In this example, since the display area for the image is already two wide, user-selection of element 112 causes a two-cell-wide expansion of the display area upward. The computing system may have determined that user input already added content to cell 108h, which is to the right of cells 108b, c, e, and f, and thus may not present an element to the right of the display area for expanding the content in that direction, because doing so may overwrite content previously specified by the user.

Elements 124a-d may enable a user to decrease the area within which the content (image 116 in this example) is displayed. For example, each user selection of element 124a may result in a one-cell-width decrease in the area in which the image 116 is displayed, while selection of element 124d may result in a similar decrease, but on the other side of the image. Elements 124b and 124c also cause a decrease in the size of the displayed region of the image 116, but with a vertical reduction rather than a horizontal reduction.

In some examples, the size of the image in the cell may expand (e.g., by stretching) as the cell changes size or the display region expands or contracts to include more or fewer cells. In some examples, the image in a display region may not stretch, but the portion of the image that is displayed may expand or decrease as the size of the cell or the size of the display region changes, for example, because only a portion of the image may have been originally displayed before the cell or display area expanded. In some examples, a combination of displaying a cropped region of an image and stretching an image may occur.

Figure 5:
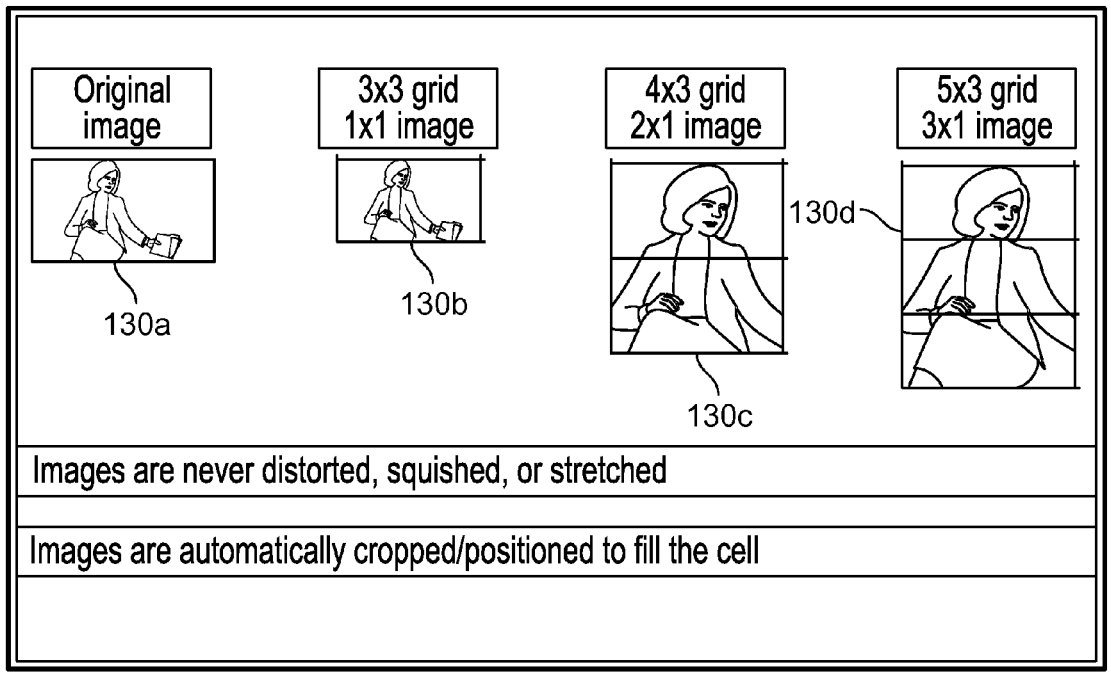

FIG. 5 illustrates example depictions of cropping and scaling an image without distorting, squishing, or stretching the image. In this example, the original image may have dimensions illustrated by depiction 130a. As a result of user input that selected image 130 for insertion into a single cell (e.g., cell 108c), the computing system may decrease or increase the overall scale of the image 130a (maintaining the same dimensions as the original image 130a) until the width or height fits within the single cell and all of the cell is filled with the image. As a result, some of the image 130b would extend outside of the cell, but the computing system may crop out or remove from display that portion of the image that does not fit within the cell. In the example shown in FIG. 5, the image is decreased in size until its width fits the size of a single cell, and the top and bottom of the image is removed so that the cell is shown full of image content, without any content outside of the cell.

Upon increasing the display area for the image to two cells (as shown with respect to depiction 130c), the display area is higher than it is wide. As a result, the computing system may increase a size of the image (maintaining its dimensions) until the top and bottom of the image fill the display area that covers the two cells, and may then crop away the sides of the image. The computing system may similarly crop the image if the display area is increased to three cells high, as shown with respect to depiction 130d. Although the above operations are described as being provided by the computing system without user input, the user may manually adjust the scaling and positioning of the image within the image display area, as described below.

Figure 6:
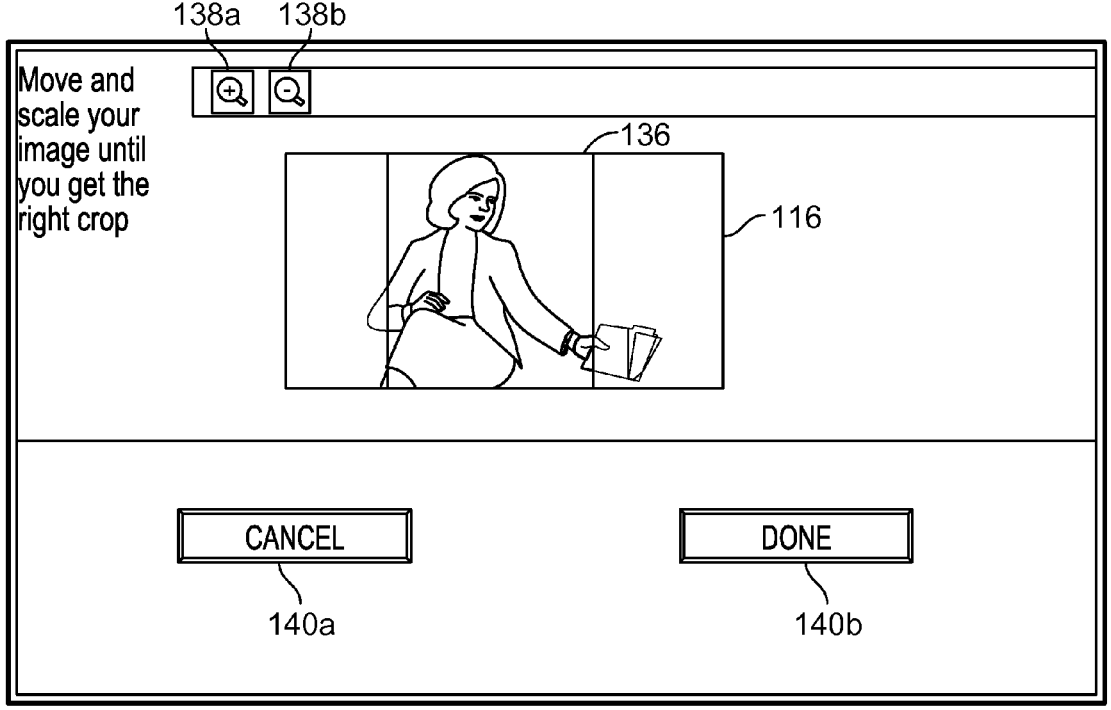

FIG. 6 illustrates a user interface that enables user input to scale and reposition an image 116 within an image display area 136 that is defined by one or more cells. This user interface may be presented as a result of user selection of the image (e.g., by double clicking or tapping the image), or through user selection of a graphical interface element that results in a display of the screen shown in FIG. 6. In FIG. 6, a user may select the image and drag the image to reposition in the image within the image display area 136. The user can also increase and decrease a scale of the image by selecting the zoom in and out buttons 138a-b.

Figure 7:
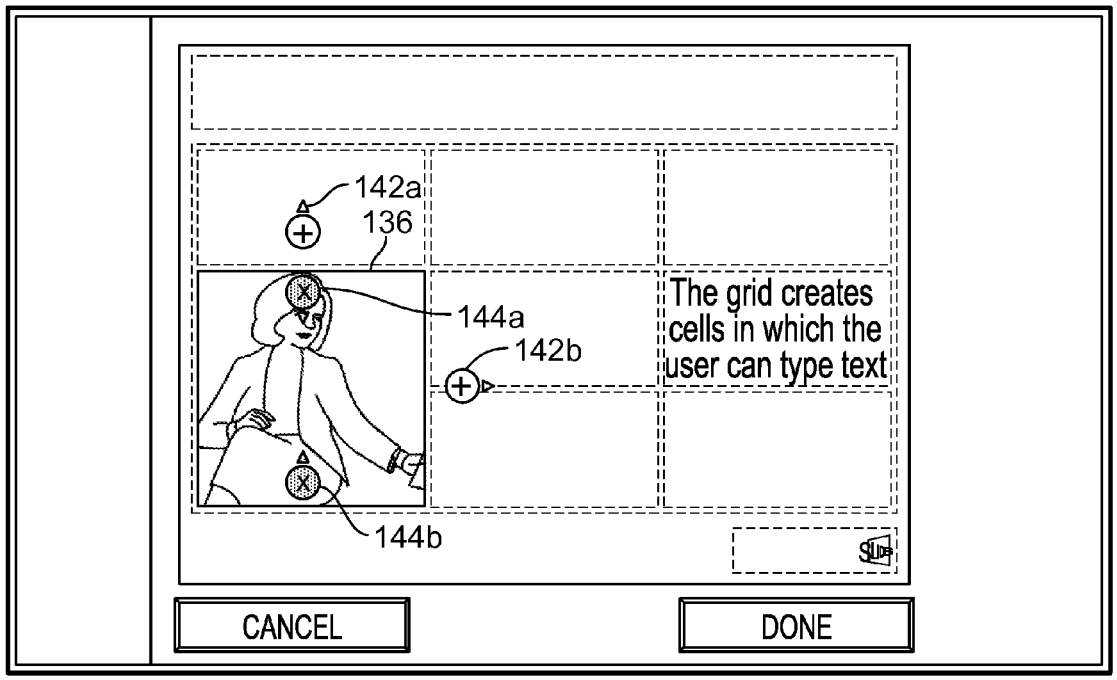

FIG. 7 illustrates a user interface after the user has scaled and repositioned image 116, as described above with respect to FIG. 6, and then has selected the "Done" button 140b. A user could also have selected the "Cancel" button 140a to revert to a previous scaling and positioning of image 140 within image display area 136. The user interface shown in FIG. 7 enables a user to expand or decrease the size of the image display area 136 through user selection of the user interface elements 142a-b and 144a-b, as described above with respect to FIGS. 3 and 4.

Figure 8:
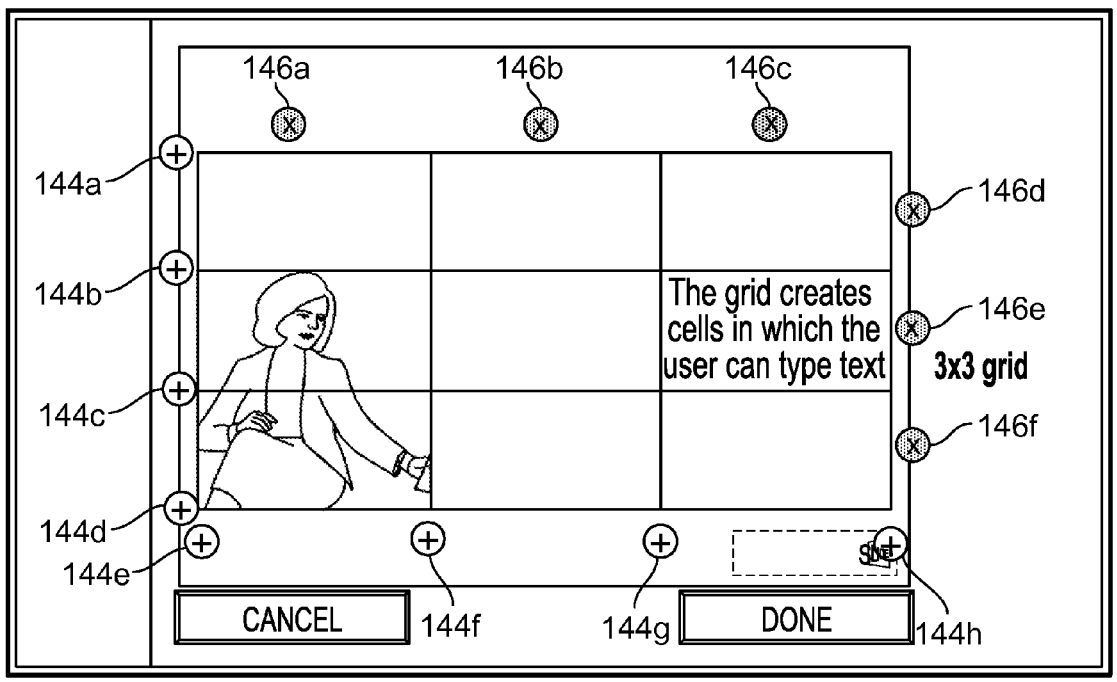

FIG. 8 illustrates a user interface with which a user is able to modify the grid by adding or removing cells to the grid. The user interface of FIG. 8 may be shown as a result of selecting a "grid" user interface element, which may be positioned outside of the grid of cells (e.g., in the bottom right of the user interface). Invoking this grid-modification user interface causes the computing system to present "+" graphical interface elements 144a-h on two of the edges of the grid (e.g., the left and bottom edges), positioned between and at the edges of each column and row but exterior to the grid. The computing system also presents "X" user interface elements 146a-f on two other edges of the grid (e.g., the top and right edges), positioned in the middle of each column and row. As an illustration, user selection of a "+" user interface element 144c may cause the computing system to insert a row of cells at the location of the selected interface element 144c. The computing system may adjust a height of all rows (now four of them) to be equal, in some implementations. In some implementations, user may be unable to modify a height or width of a cell to be different than a height or width of any other cell in the grid.

Moreover, since the row of cells includes a cell that is being inserted in between two cells that contain a single image, that image may stretch to occupy all three cells. In other words, when a content display region stretches across two cells and a user adds a row or column between those two cells, the content display region may expand to cover three cells. Conversely, when a content display region borders a row or a column that is added by a user, that content display region may move as its underlying cell is moved with the addition of the row or column, and the content display region may not expand to cover the newly added adjacent cell.

Figure 9:
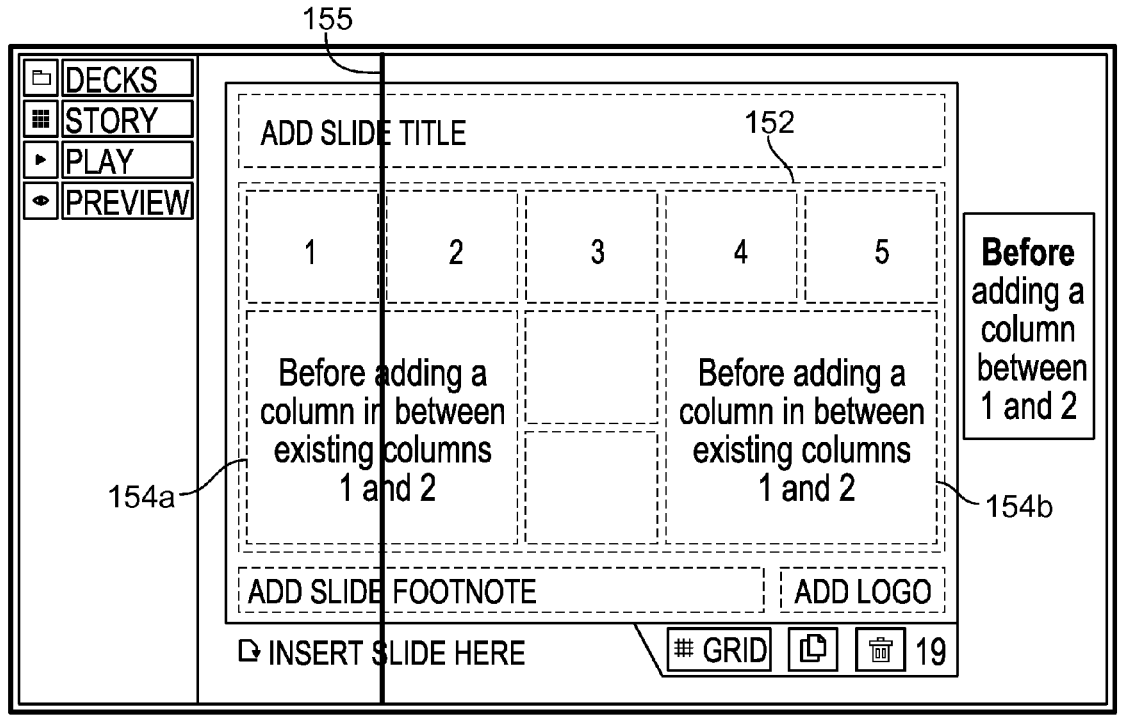
Figure 10:
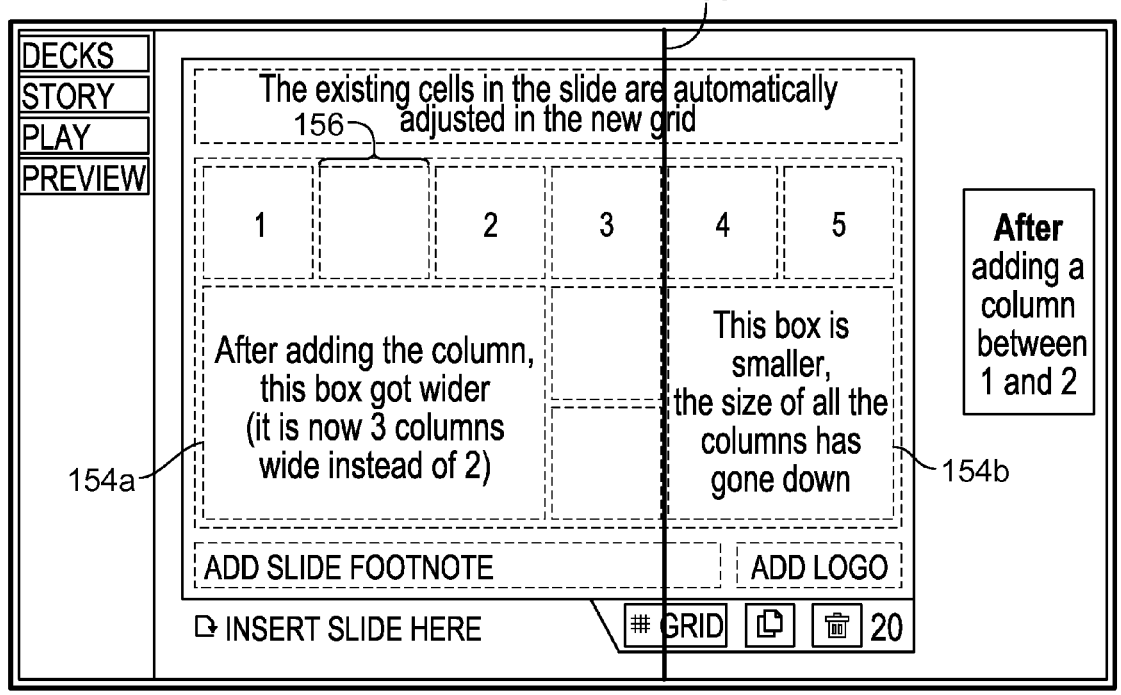

FIGS. 9 and 10 illustrate the addition of a new column of cells and its effect on content already displayed in a 3×5 grid of cells 152. The grid of cells 152 includes two content display regions 154a and 154b. The rest of the cells in the grid may be considered in this example to include no content or content display regions (even though some cells include numbers for purposes of this illustration). In this illustration, a user provides user input to insert a column of cells at the location of bar 155. This user input may be provided by selecting a user interface element such as element 144f (FIG. 8).

As a result of user selection of such a column-adding user element, the extra row of cells 156 is added. As illustrated in FIG. 10, the content display region 154a has expanded to cover a width of three cells, since the computing system identified that the inserted row of cells includes a cell within an interior of the content display region 154a. On the other hand, while the content display region 154b continues to cover a width of two cells, the content display region 154b has shrunk in width because the addition of the column of cells 156 results in a decreasing width of each other cell in the grid. In other words, the four corners of a content display region may remain pinned to the respective corners of the cells that underlie the content display region (or the content display region may be considered a cell that grows in size). As such, should a user provide input to add a column or row to the side of a content display region (e.g., at the location of bar 158), a column or row may be added, but the content display region may not expand to include area that is part of the new column or row.

Stated another way, as shown by the transition between FIGS. 9 and 10, adding a column of cells between the first and second column of cells causes any content that is contained in cells that stretch across the first and second column to further stretch to cover three columns. Moreover, as shown in FIGS. 9 and 10, each individual cell is reduced in size, such that content in a single cell or content that is stretched across multiple cells (other than content into the interior of which a column is being introduced) will decrease in scale.

Figure 11:
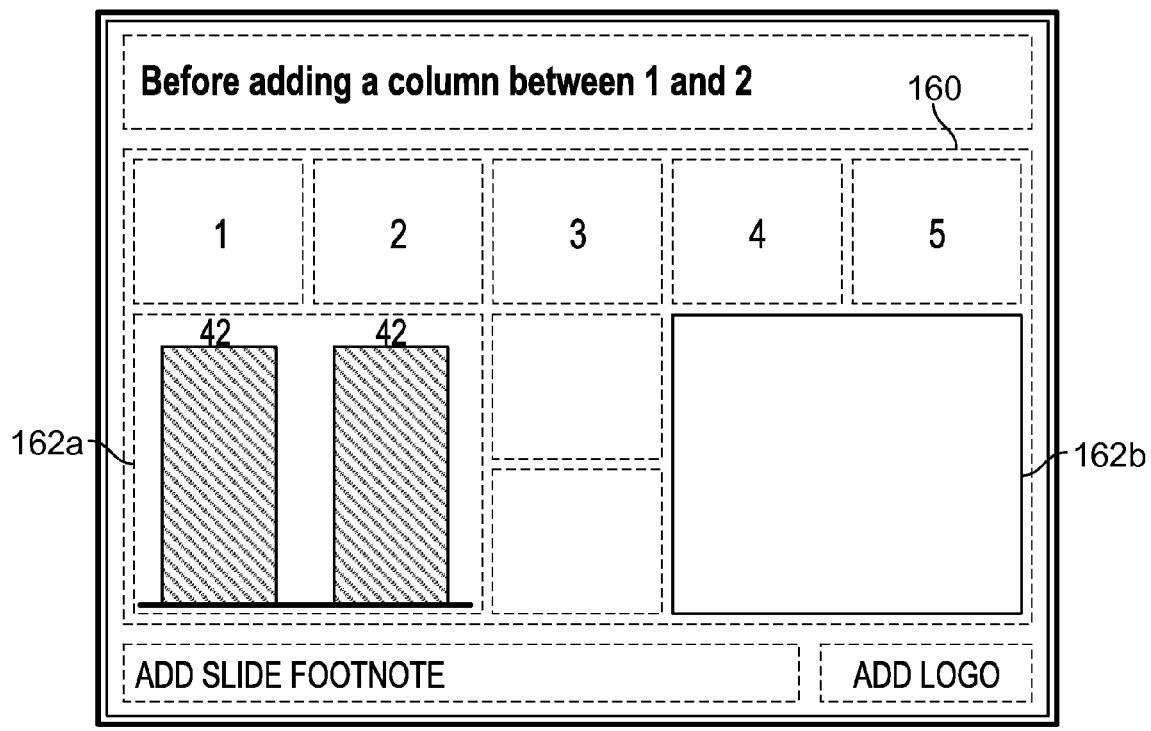

This addition of a column or row is further illustrated with reference to the data presentation views shown in FIGS. 11-14. In some examples, a content display region may present a chart of data values, for example, as a bar chart, a line chart, or various other graphical representations of data values. The computing system may illustrate a single data point per column or row (e.g., with a single bar in a bar graph). Thus, if a user expands a content display area to include an additional row or column of cells, the number of data points that the content display area presents can increase. As an illustration, FIG. 11 shows a grid of cells 160 that includes content display regions 162a and 162b. As a result of user input that adds a column of cells between columns 1 and 2 (as numbered in the figure), the computing system expands the content display region 162a to cover the width of three cells (the width of the two original columns, plus the width of the inserted cell column). This is as described above with respect to FIGS. 9 and 10, but in this instance the content presented in content display area 162a is graph data, which may result in a presentation that is modified differently than if the content were a static image.

For example, the computing system may be configured to display the graph data with a single data point represented within each column, or with each data point represented by a certain width (e.g., a certain number of pixels for each vertical bar). As such, in some implementations, increasing the width of the content display area may permit the computing system to add additional data points to the graph. In the example illustrated in FIGS. 11 and 12, the computing system adds an additional bar to correspond to the added column (although in some examples there could have been 6 bars presented in content display area 162a in FIGS. 11, and 9 bars presented in content display area 162a in FIG. 12). The data from which the chart is generated may be a table, spreadsheet, or set of data values that include at least as many values, and maybe more values, than the data points presented by the chart, with the computing system selecting a subset of the values (or averaging sets of the values) in order to generate the representations of the data points in the content display area 162a. As such, upon expanding the content display area, the computing system may be able to select a larger subset of the values for illustration in the content display area with a greater number of representations of the data points. A similar result may be achieved when user input adds a row through the interior of a content display area in which the graphical bars face side-to-side rather than top-to-bottom.

Figure 12:
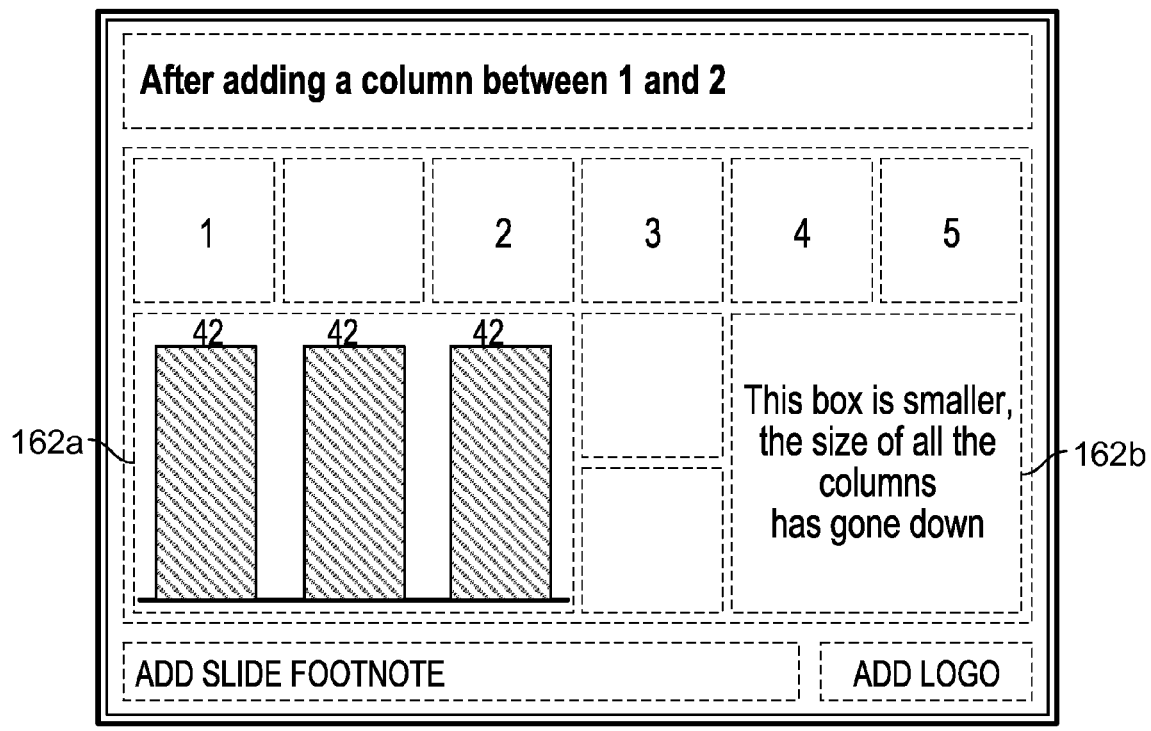
Figure 13:
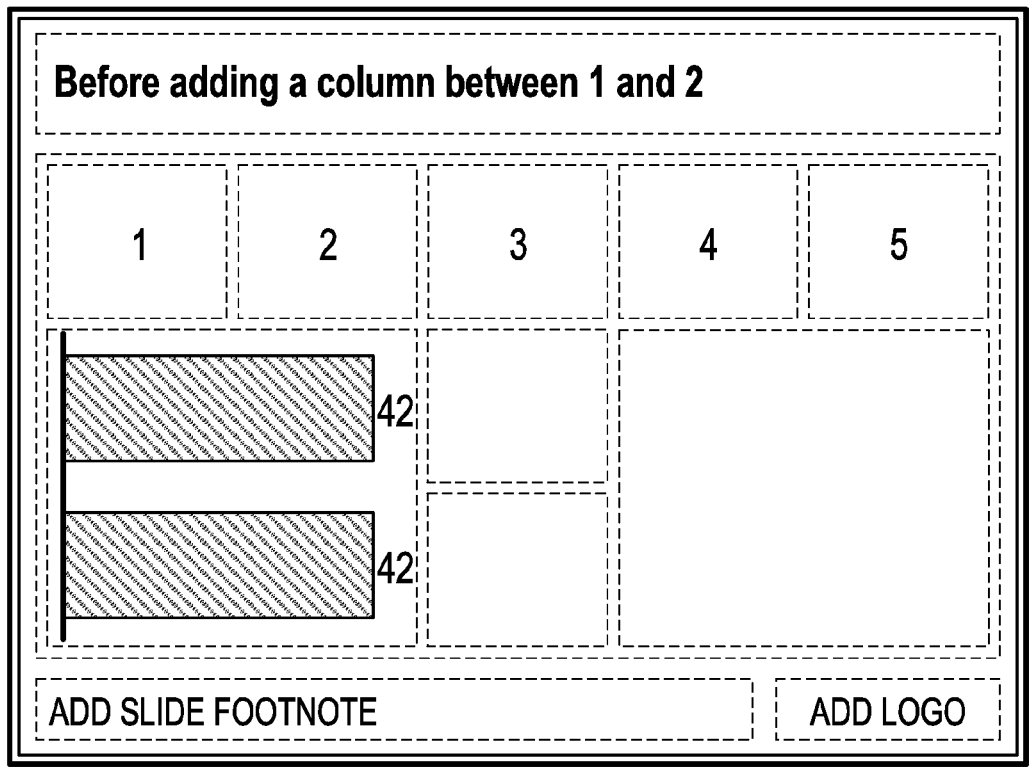
Figure 14:
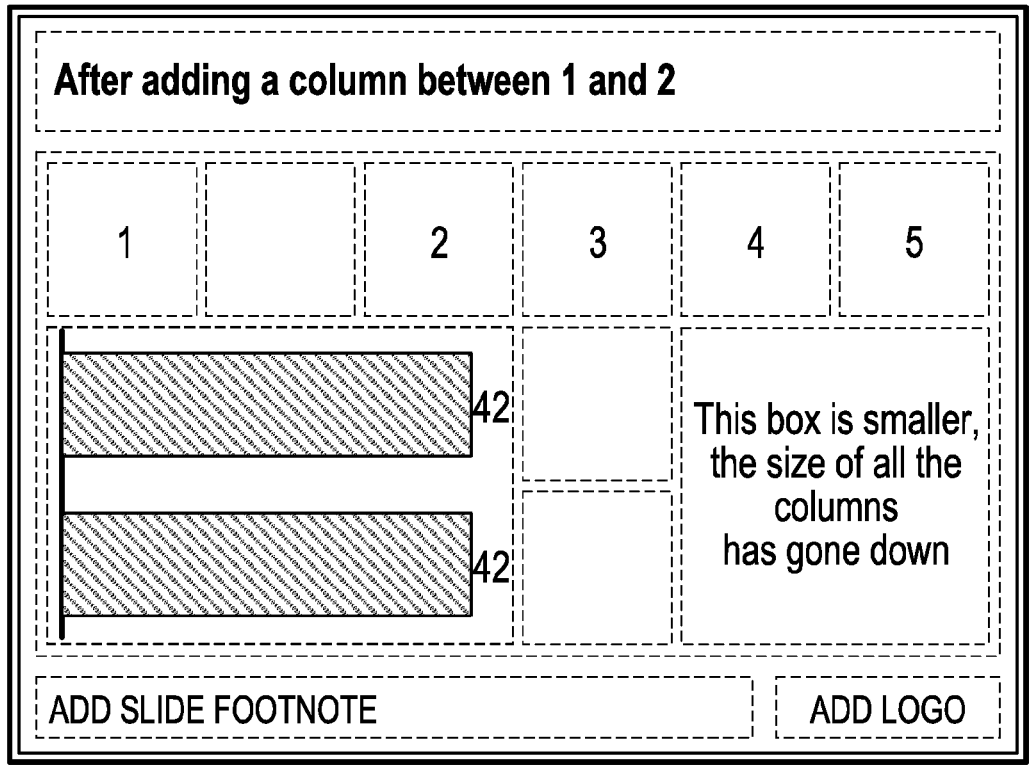

FIGS. 13 and 14 illustrate that the addition of a column that expands a content display area can increase a scale of the representations of the data values (rather than a number of the representations of the data values, as described with respect to FIGS. 11 and 12). For example, because the representations of the data values in FIG. 13 (e.g., the bars) are presented on their side, there are no additional data values (e.g., bars) to add when a column is added between columns 1 and 2. Rather, the scale or length of the bars increases.

Figure 15:
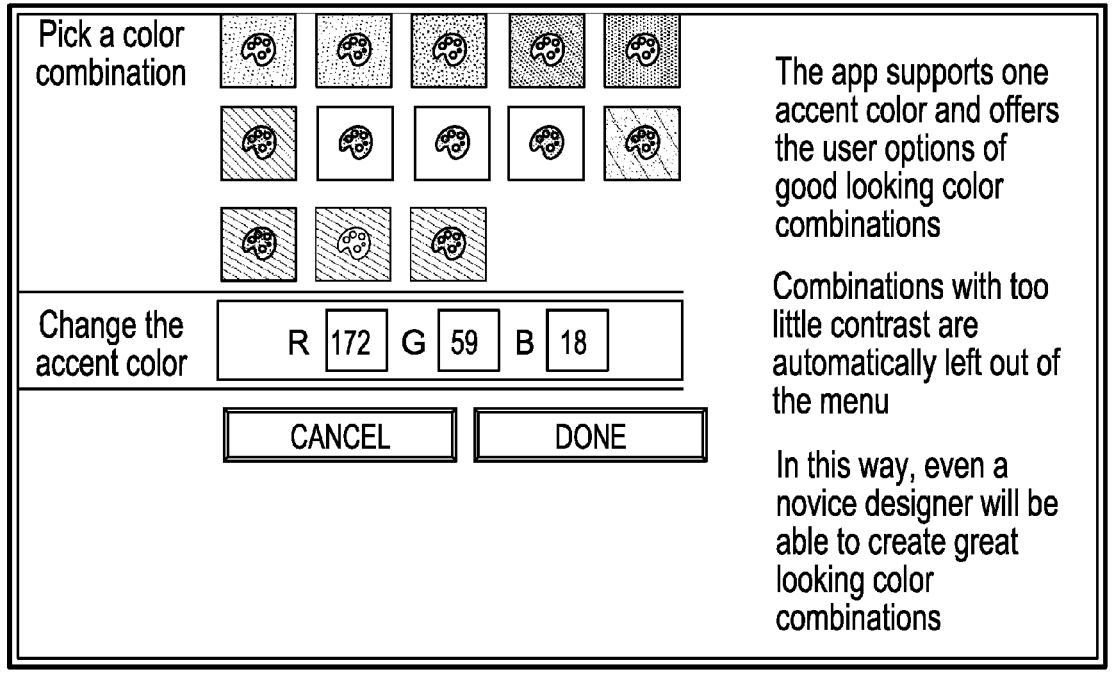
Figure 16:
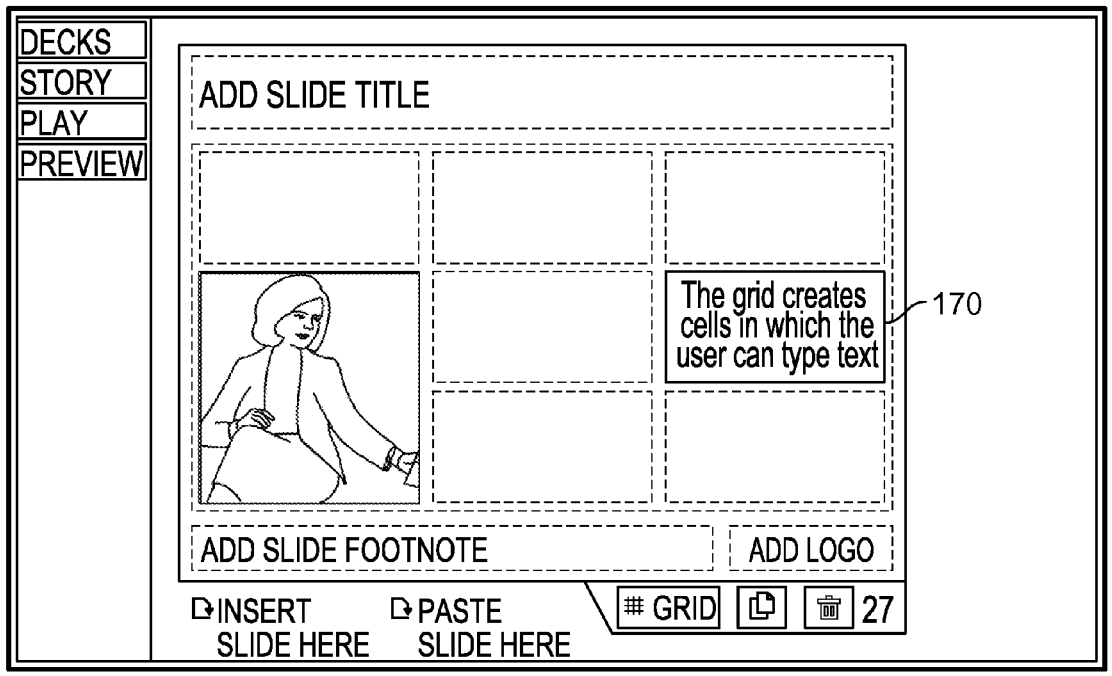

FIG. 15 presents a color selection screen that may be displayed in response to user selection of a "color" user interface element (e.g., element 114*i* in FIG. 2). The color selection screen may present a set of determined color combination options for a cell. As a result of selecting a different set of color combinations, the background and text in the selected cell may change color to match the user selection, as illustrated by content display region 170 in FIG. 16.

Figure 17:
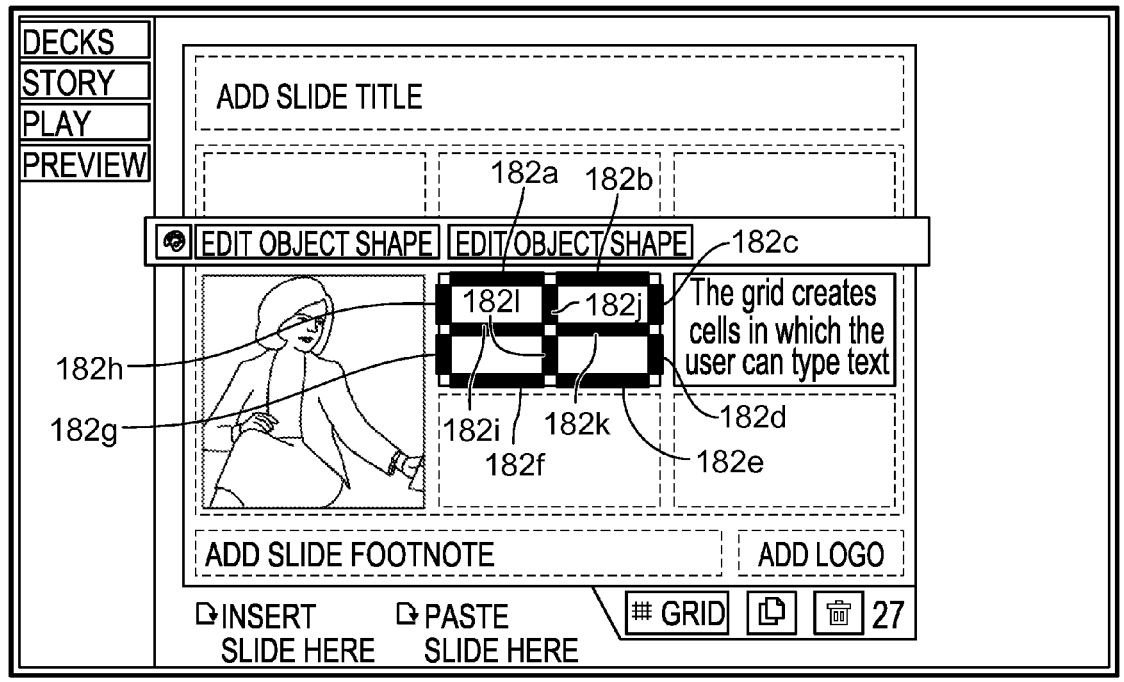

FIG. 17 presents a screen that may be displayed in response to user selection of an edit object type button (e.g., element 114*l* in FIG. 2). As an example, selection of the edit object type button 114*l* may cause presentation of user interface elements labelled "Text," "Column Chart," "Bar Chart," Stack Chart," and "Connector," which a user is able to select to cause a change in the type of content presented or designated for presentation within the selected cell. For example, if there is already text in the cell and a user selects "Column Chart," that text may disappear and a column chart may appear.

Figure 18:
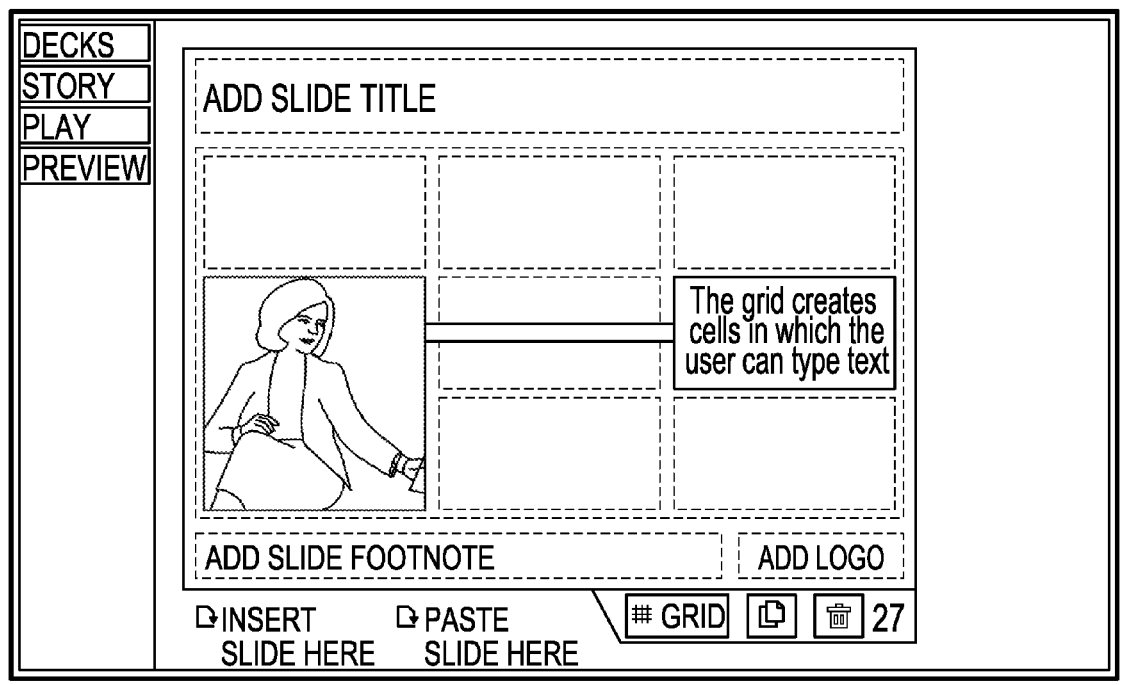

As a further illustration, upon selection of the above-described "connector" interface element, the computing system may present the user interface shown in FIG. 17. A user may select any combination of segments 182*a-l* cause those segments to appear within the designated content selection area. For example, FIG. 18 shows a bar extending across the content presentation area that results from user selection of segments 182*i* and 182*k*. The displayed bars may be solid, even though the segments 182*a-l* in FIG. 17 are shown with unshaded areas to designate the separation between the segments 182*a-l*. Some segments (e.g., those on the periphery of the content display region) may be shared with the adjacent cells or content display regions, and thus may modifiable through the user interaction with multiple cells or content display regions. In some examples, the segments may be added to create a border around other content (e.g., an image) within a content display area.

Figure 19:
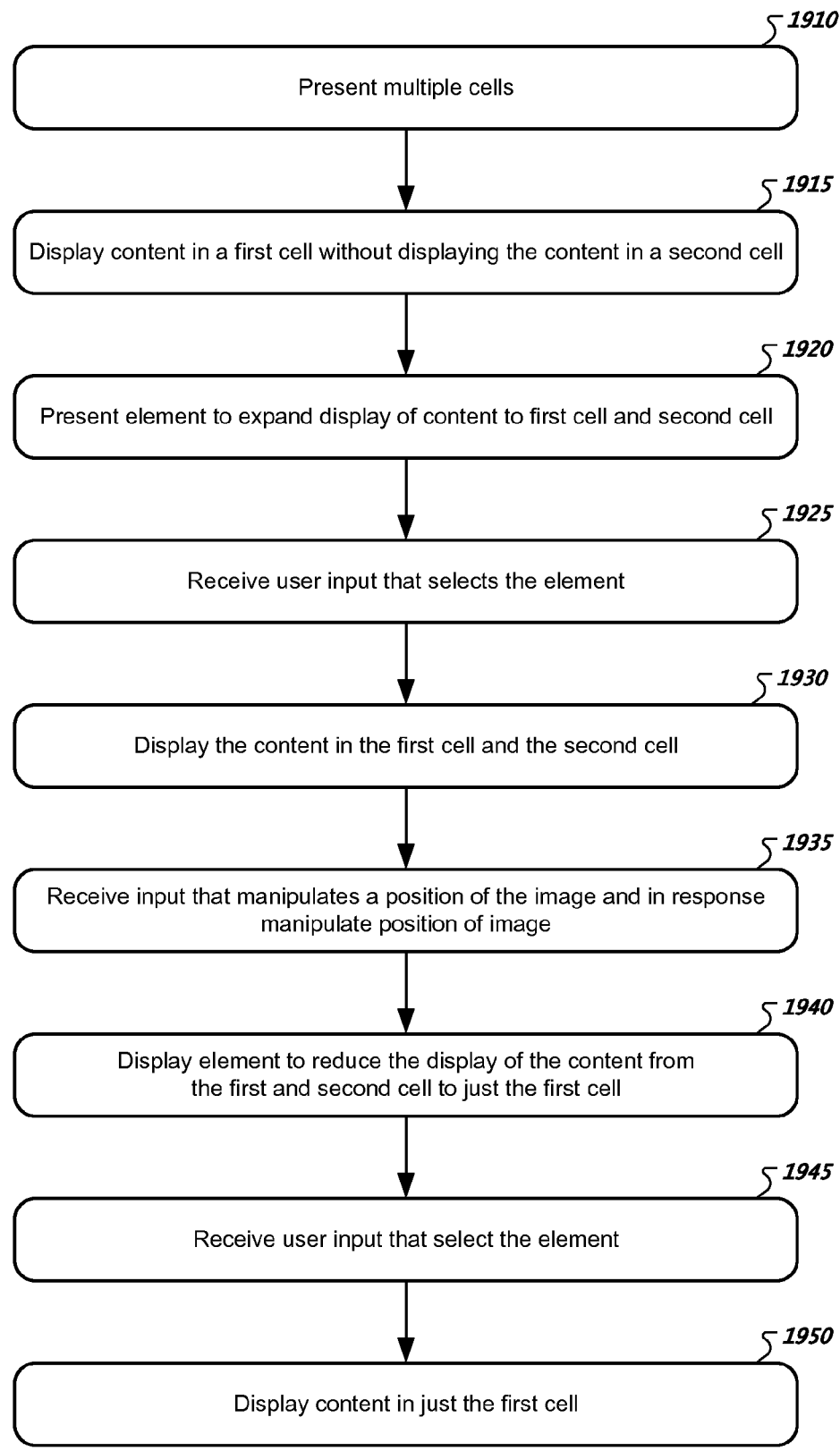
FIGS. 19 and 20 show flow charts of operations for generating a user interface.

FIG. 19 shows a flowchart for performing operations to generate a user interface.

At box 1910, a computing system presents multiple cells that are arranged in a multi-dimensional grid of cells. For example, a computing system may display the user interface that is presented in FIG. 1.

At box 1915, the computing system displays content in a first cell of the multiple cells without displaying the content in a second cell of the multiple cells. For example, the computing system may display the image 116 (FIG. 2) in cell 108*c* without displaying the image (or any portion thereof) in any of the adjoining cells.

At box 1920, the computing system presents a first user interface element that is to expand the display of the content from the first cell to both the first cell and the second cell. For example, the computing system may display the elements 120*a-b* (FIG. 3). In some examples, the first user interface element is presented as a result of a user selecting the cell (e.g., by clicking on cell 108*c* in FIG. 1), then selecting the image icon 114*j* that appears in the bar 112, and then providing input that selects a particular image.

At box 1925, the computing system receives first user input that selects the first user interface element. For example, a user may click or touch one or more of the elements 120*a-b* (FIG. 3).

At box 1930, the computing system displays the content in the first cell and the second cell. For example, the image 116 may now display in both cells 108*c* and 108*f* in response to user selection of element 120*b* (FIG. 3). FIG. 3 illustrates the result when a user has expanded the content display area for the image to four cells.

At box 1935, the computing system receives user input that manipulates a position of the image with respect to a content display area (e.g., a single cell, or a collection of multiple cells) in which the image is displayed, and in response the computing system changes from presenting a portion of the image in the content display area to presenting a different portion of the image in the content display area. For example, in FIG. 6, a user provides input to reposition the portion of the image that is displayed within a particular display area (which may cover one cell or which may cover multiple cells).

At box 1940, the computing system displays a user interface element to reduce the display of the content from both the first cell and the second cell to the first cell without display in the second cell. For example, the computing system may display elements 124*a-d* (FIG. 4).

At box 1945, the computing system receives user input that selects the user interface element to reduce the display of the content. For example, the computing system may receive user input that selects one or more of display elements 124*a-d*.

At box 1950, the computing system displays content in the first cell without displaying the content in the second cell. For example, the computing system may display content in just a single cell, as illustrated in FIG. 2.

Figure 20:
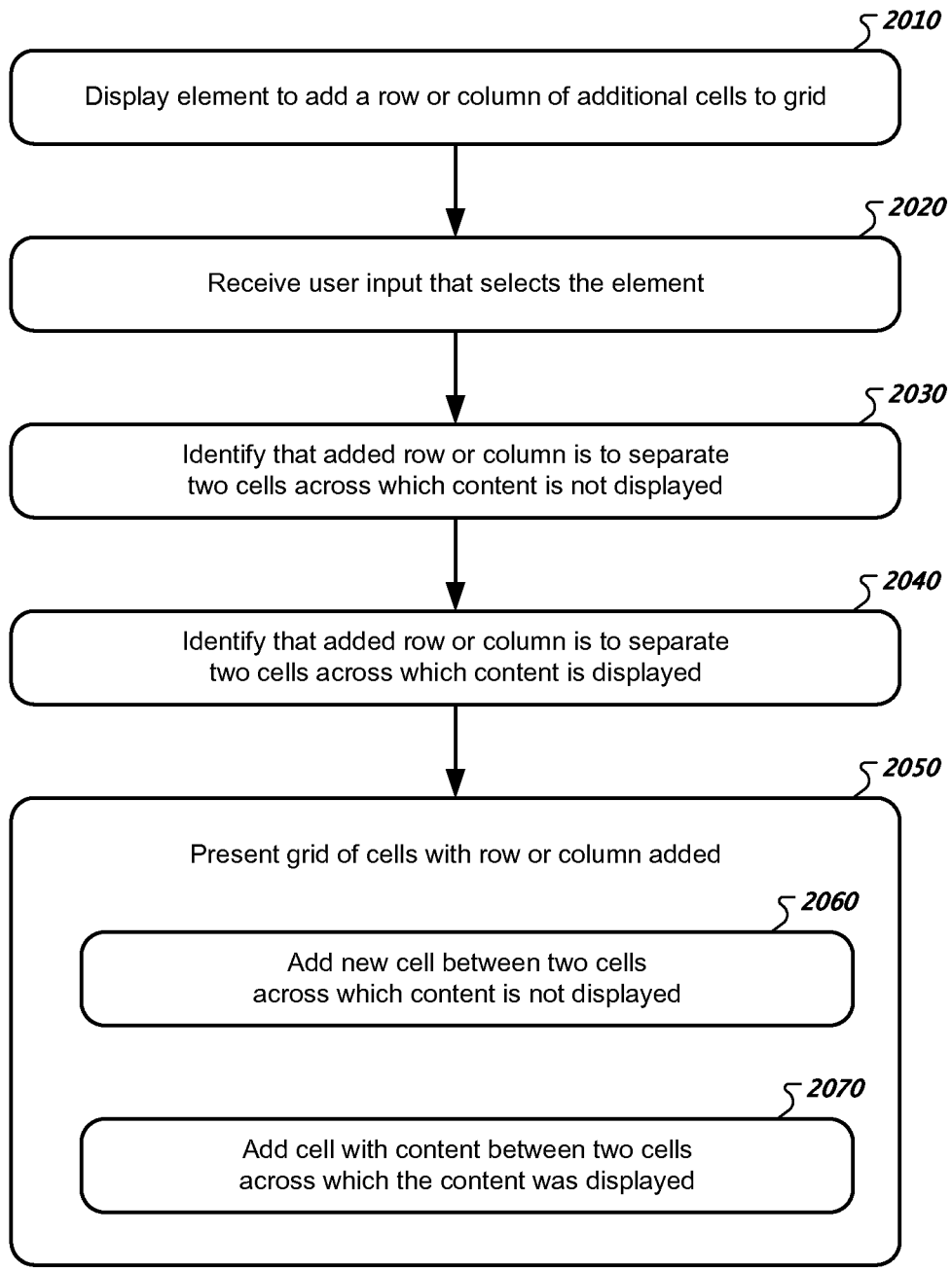

FIG. 20 shows a flowchart for performing operations to generate a user interface.

At box 2010, the computing system displays a user interface element to add a row or column of additional cells to the multi-dimensional grid of cells. For example, the computing system may display the screen of FIG. 8, and receive user input that selects one of the "+" elements (e.g., element 144*f*).

At box 2020, the computing system receives user input that selects the element, for example, by selecting the element with a mouse cursor or by touching the element on a touchscreen.

At box 2030, the computing system identifies that the added row or column is to separate two cells across which content is not displayed. For example, with reference to FIG. 9, the computing system may identify that the column is to be added at the location of bar 155, and that there is no content displayed across the cells that are identified as 1 and 2.

At box 2040, the computing system identifies that the added row or column is to separate two cells across which content is displayed. For example, with reference to FIG. 9, the computing system may identify that the column is to be added at the location of bar 155, and that there is content displayed between each of the pairs of cells beneath the cells identified as 1 and 2.

At box 2050, the computing system presents the grid of cells with the row or column added. For example, FIG. 10 shows that a column of cells has been added at the location of bar 155 in FIG. 9. The added column may include a blank or new cell between the two cells across which content was not displayed. For example, the cell between cells "1" and "2" is blank or new (in other words, it may not contain previously user-specified content, such as content that was specified by a user for inclusion in either of the adjacent cells). The added column may include a cell between two cells across which content was previously displayed, and include in that cell the content that was displayed across the two cells. For example, the cell that is added within display region 154a includes the shading and a portion of the text that was previously presented within display region 154a.

Figure 21:
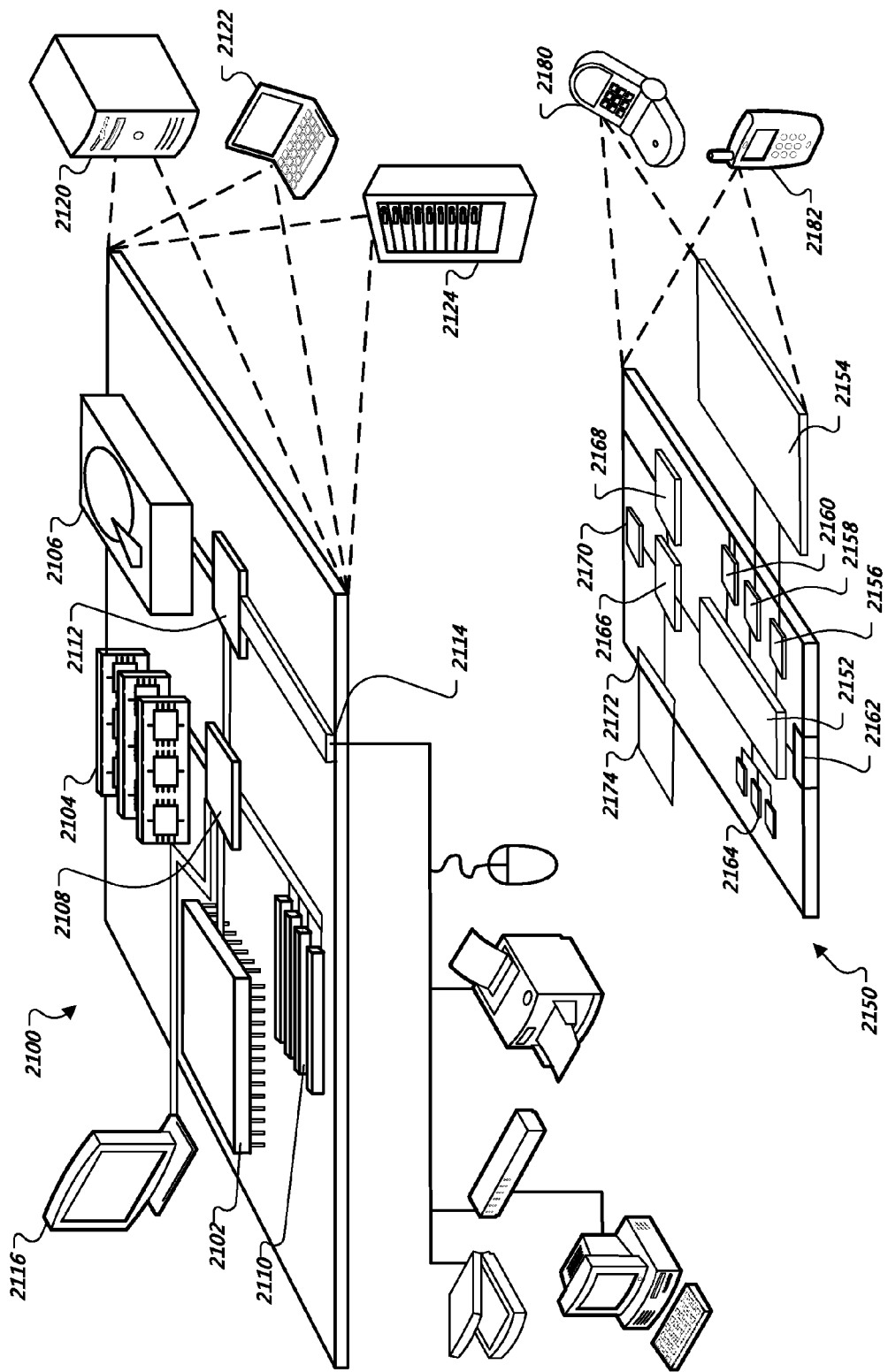
FIG. 21 is a block diagram of computing devices that may be used to implement the systems and methods described in this document, as either a client or as a server or plurality of servers.

FIG. 21 presents a block diagram of computing devices 2100, 2150 that may be used to implement the systems and methods described in this document, as either a client or as a server or plurality of servers. Computing device 2100 is intended to represent various forms of digital computers, such as laptops, desktops, workstations, personal digital assistants, servers, blade servers, mainframes, and other appropriate computers. Computing device 2150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 2100 includes a processor 2102, memory 2104, a storage device 2106, a high-speed interface 2108 connecting to memory 2104 and high-speed expansion ports 2110, and a low speed interface 2112 connecting to low speed bus 2114 and storage device 2106. Each of the components 2102, 2104, 2106, 2108, 2110, and 2112, are interconnected using various busses, and may be mounted on a common motherboard or in other manners as appropriate. The processor 2102 can process instructions for execution within the computing device 2100, including instructions stored in the memory 2104 or on the storage device 2106 to display graphical information for a GUI on an external input/output device, such as display 2116 coupled to high-speed interface 2108. In other implementations, multiple processors and/or multiple buses may be used, as appropriate, along with multiple memories and types of memory. Also, multiple computing devices 2100 may be connected, with each device providing portions of the necessary operations (e.g., as a server bank, a group of blade servers, or a multi-processor system).

The memory 2104 stores information within the computing device 2100. In one implementation, the memory 2104 is a volatile memory unit or units. In another implementation, the memory 2104 is a non-volatile memory unit or units. The memory 2104 may also be another form of computer-readable medium, such as a magnetic or optical disk.

The storage device 2106 is capable of providing mass storage for the computing device 2100. In one implementation, the storage device 2106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2104, the storage device 2106, or memory on processor 2102.

The high-speed controller 2108 manages bandwidth-intensive operations for the computing device 2100, while the low speed controller 2112 manages lower bandwidth-intensive operations. Such allocation of functions is by way of example only. In one implementation, the high-speed controller 2108 is coupled to memory 2104, display 2116 (e.g., through a graphics processor or accelerator), and to high-speed expansion ports 2110, which may accept various expansion cards (not shown). In the implementation, low-speed controller 2112 is coupled to storage device 2106 and low-speed expansion port 2114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2100 may be implemented in a number of different forms, as shown in the figure. For example, it may be implemented as a standard server 2120, or multiple times in a group of such servers. It may also be implemented as part of a rack server system 2124. In addition, it may be implemented in a personal computer such as a laptop computer 2122. Alternatively, components from computing device 2100 may be combined with other components in a mobile device (not shown), such as device 2150. Each of such devices may contain one or more of computing device 2100, 2150, and an entire system may be made up of multiple computing devices 2100, 2150 communicating with each other.

Computing device 2150 includes a processor 2152, memory 2164, an input/output device such as a display 2154, a communication interface 2166, and a transceiver 2168, among other components. The device 2150 may also be provided with a storage device, such as a microdrive or other device, to provide additional storage. Each of the components 2150, 2152, 2164, 2154, 2166, and 2168, are interconnected using various buses, and several of the components may be mounted on a common motherboard or in other manners as appropriate.

The processor 2152 can execute instructions within the computing device 2150, including instructions stored in the memory 2164. The processor may be implemented as a chipset of chips that include separate and multiple analog and digital processors. Additionally, the processor may be implemented using any of a number of architectures. For example, the processor 2152 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 2150, such as control of user interfaces, applications run by device 2150, and wireless communication by device 2150.

Processor 2152 may communicate with a user through control interface 2158 and display interface 2156 coupled to a display 2154. The display 2154 may be, for example, a TFT (Thin-Film-Transistor Liquid Crystal Display) display or an OLED (Organic Light Emitting Diode) display, or other appropriate display technology. The display interface 2156 may comprise appropriate circuitry for driving the display 2154 to present graphical and other information to a user. The control interface 2158 may receive commands from a user and convert them for submission to the processor 2152. In addition, an external interface 2162 may be provided in communication with processor 2152, so as to enable near area communication of device 2150 with other devices. External interface 2162 may provide, for example, for wired communication in some implementations, or for wireless communication in other implementations, and multiple interfaces may also be used.

The memory 2164 stores information within the computing device 2150. The memory 2164 can be implemented as one or more of a computer-readable medium or media, a volatile memory unit or units, or a non-volatile memory unit or units. Expansion memory 2174 may also be provided and connected to device 2150 through expansion interface 2172, which may include, for example, a SIMM (Single In Line Memory Module) card interface. Such expansion memory 2174 may provide extra storage space for device 2150, or may also store applications or other information for device 2150. Specifically, expansion memory 2174 may include instructions to carry out or supplement the processes described above, and may include secure information also. Thus, for example, expansion memory 2174 may be provided as a security module for device 2150, and may be programmed with instructions that permit secure use of device 2150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2164, expansion memory 2174, or memory on processor 2152 that may be received, for example, over transceiver 2168 or external interface 2162.

Device 2150 may communicate wirelessly through communication interface 2166, which may include digital signal processing circuitry where necessary. Communication interface 2166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2168. In addition, short-range communication may occur, such as using a Bluetooth, WiFi, or other such transceiver (not shown). In addition, GPS (Global Positioning System) receiver module 2170 may provide additional navigation- and location-related wireless data to device 2150, which may be used as appropriate by applications running on device 2150.

Device 2150 may also communicate audibly using audio codec 2160, which may receive spoken information from a user and convert it to usable digital information. Audio codec 2160 may likewise generate audible sound for a user, such as through a speaker, e.g., in a handset of device 2150. Such sound may include sound from voice telephone calls, may include recorded sound (e.g., voice messages, music files, etc.) and may also include sound generated by applications operating on device 2150.

The computing device 2150 may be implemented in a number of different forms, some of which are shown in the figure. For example, it may be implemented as a cellular telephone 2180. It may also be implemented as part of a smartphone 2182, personal digital assistant, or other similar mobile device.

Additionally computing device 2100 or 2150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for generating a slide for a presentation of multiple slides, comprising:
presenting, by a computing system, a slide-creation user interface that includes multiple cells that are arranged in a multi-dimensional grid of cells;
receiving, by the computing system, user input that adds an image to a first cell of the multiple cells;
displaying, by the computing system, the image in the first cell of the multiple cells without displaying the image in a second cell of the multiple cells and without displaying the image in a third cell of the multiple cells;
presenting, by the computing system, a first user interface element that is to expand the display of the image from the first cell to both the first cell and the second cell, wherein the computing system is configured to expand the display of the image from the first cell to both the first cell and the second cell in response to receiving a first user input that selects the first user interface element;
presenting, by the computing system and concurrent with the display of the first user interface element, a second user interface element that is to expand the display of the image from the first cell to both the first cell and the third cell, wherein the computing system is configured to expand the display of the image from the first cell to both the first cell and the third cell in response to receiving a second user input that selects the second user interface element;
receiving, by the computing system, third user input that adds text to a fourth cell of the multiple cells, wherein the second cell, the third cell, and the fourth cell are adjacent to the first cell, wherein the computing system is configured to not present a user interface element that is to expand the display of the image from the first cell to both the first cell and the fourth cell, concurrent with the display of the first user interface element and the second user interface element, as a result of the fourth cell being determined by the computing system to include the text;
receiving, by the computing system, the first user input that selects the first user interface element that is to expand the display of the image from the first cell to both the first cell and the second cell;
displaying, by the computing system and in response to receiving the first user input that selects the first user interface element, the image in both the first cell and the second cell;
receiving, by the computing system, a fourth user input that selects a third user interface element that is to play the presentation of multiple slides; and
presenting, by the computing system, the image in at least the first cell and second cell in a first slide in a playing of the presentation of multiple slides, in which the image is non-expandable and user input is able to navigate from the first slide of the presentation to a second slide of the presentation.

2. The computer-implemented method of claim 1, further comprising:
receiving, by the computing system, a fifth user input that selects the first cell; and
displaying, by the computing system and in response to receiving the fifth user input that selects the first cell, multiple user interface elements which are able to be selected with additional user input to modify content of the first cell.

3. The computer-implemented method of claim 2, wherein:
the first user interface element is presented by the computing system in response to sixth user input that selects one of the multiple user interface elements; and
the multiple user interface elements include another user interface element which, when selected, changes positioning of text that is in the first cell, the text having been specified through additional user input that typed the text.

4. The computer-implemented method of claim 1, further comprising:
displaying, by the computing system after the computing system has displayed the image in the first cell and the second cell in response to receiving the first user input, a fourth user interface element that is to reduce the display of the image from (a) both the first cell and the second cell to (b) the first cell without display in the second cell;
receiving, by the computing system, a fifth user input that selects the fourth user interface element that is to reduce the display of the image; and
displaying, by the computing system and in response to receiving the fifth user input that is to reduce the display of the image, the image in the first cell without display of the image in the second cell.

5. The computer-implemented method of claim 4, wherein the fourth user interface element is displayed concurrently with the second user interface element that is to expand the display of the image from (a) the first cell and the second cell to (b) the first cell and the second cell and the third cell.

6. The computer-implemented method of claim 1, wherein:
displaying the image in the first cell without displaying the image in the second cell includes displaying a first portion of the image in the first cell without displaying a second portion of the image in the second cell; and
displaying the image in the first cell and the second cell includes displaying the first portion of the image in the first cell and the second portion of the image in the second cell.

7. The computer-implemented method of claim 6, further comprising:
receiving, by the computing system, a fifth user input that manipulates a position of the image with respect to the first cell, and in response changing from presenting the first portion of the image in the first cell to presenting a third portion of the image in the first cell.

8. The computer-implemented method of claim 1, further comprising:
displaying, by the computing system, a fourth user interface element that is to add a row or column of additional cells to the multi-dimensional grid of cells;
receiving, by the computing system, a fifth user input that selects the fourth user interface element that is to add the row or column of additional cells;
identifying, by the computing system, that the added row or column is to separate a fifth cell from a sixth cell across which content is not displayed;
identifying, by the computing system, that the added row or column is to separate a seventh cell from an eighth cell across which content is displayed before the fifth user input is received;

presenting, by the computing system, the multi-dimensional grid of cells with the row or column of additional cells added, including a display of:
(i) a ninth cell, without user-specified content, added between the fifth cell and the sixth cell as a result of the computing system having identified that content is not displayed across the fifth cell and the sixth cell, and
(ii) a tenth cell, including the content that is displayed across the seventh cell and the eighth cell, added between the seventh cell and the eighth cell.

9. One or more non-transitory computer-readable storage devices including instructions that, when executed by one or more computer processors, cause performance of operations for generating a slide for a presentation of multiple slides, the operations including:
presenting, by a computing system, a slide-creation user interface that includes multiple cells that are arranged in a multi-dimensional grid of cells;
receiving, by the computing system, user input that adds an image to a first cell of the multiple cells;
displaying, by the computing system, the image in the first cell of the multiple cells without displaying the image in a second cell of the multiple cells and without displaying the image in a third cell of the multiple cells;
presenting, by the computing system, a first user interface element that is to expand the display of the image from the first cell to both the first cell and the second cell, wherein the computing system is configured to expand the display of the image from the first cell to both the first cell and the second cell in response to receiving a first user input that selects the first user interface element;
presenting, by the computing system and concurrent with the display of the first user interface element, a second user interface element that is to expand the display of the image from the first cell to both the first cell and the third cell, wherein the computing system is configured to expand the display of the image from the first cell to both the first cell and the third cell in response to receiving a second user input that selects the second user interface element;
receiving, by the computing system, third user input that adds text to a fourth cell of the multiple cells, wherein the second cell, the third cell, and the fourth cell are adjacent to the first cell, wherein the computing system is configured to not present a user interface element that is to expand the display of the image from the first cell to both the first cell and the fourth cell, concurrent with the display of the first user interface element and the second user interface element, as a result of the fourth cell being determined by the computing system to include the text;
receiving, by the computing system, the first user input that selects the first user interface element that is to expand the display of the image from the first cell to both the first cell and the second cell;
displaying, by the computing system and in response to receiving the first user input that selects the first user interface element, the image in both the first cell and the second cell;
receiving, by the computing system, a fourth user input that selects a third user interface element that is to play the presentation of multiple slides; and
presenting, by the computing system, the image in at least the first cell and second cell in a first slide in a playing of the presentation of multiple slides, in which the image is non-expandable and user input is able to navigate from the first slide of the presentation to a second slide of the presentation.

10. The one or more computer-readable storage devices of claim 9, wherein the operations further comprise:
receiving, by the computing system, a fifth user input that selects the first cell; and
displaying, by the computing system and in response to receiving the fifth user input that selects the first cell, multiple user interface elements which are able to be selected with additional user input to modify content of the first cell.

11. The one or more computer-readable storage devices of claim 10, wherein:
the first user interface element is presented by the computing system in response to sixth user input that selects one of the multiple user interface elements; and
the multiple user interface elements include another user interface element which, when selected, changes positioning of text that is in the first cell, the text having been specified through additional user input that typed the text.

12. The one or more computer-readable storage devices of claim 9, wherein the operations further comprise:
displaying, by the computing system after the computing system has displayed the image in the first cell and the second cell in response to receiving the first user input, a fourth user interface element that is to reduce the display of the image from (a) both the first cell and the second cell to (b) the first cell without display in the second cell;
receiving, by the computing system, a fifth user input that selects the fourth user interface element that is to reduce the display of the image; and
displaying, by the computing system and in response to receiving the fifth user input that is to reduce the display of the image, the image in the first cell without display of the image in the second cell.

13. The one or more computer-readable storage devices of claim 12, wherein the fourth user interface element is displayed concurrently with the second user interface element that is to expand the display of the image from (a) the first cell and the second cell to (b) the first cell and the second cell and the third cell.

14. The one or more computer-readable storage devices of claim 9, wherein:
displaying the image in the first cell without displaying the image in the second cell includes displaying a first portion of the image in the first cell without displaying a second portion of the image in the second cell; and
displaying the image in the first cell and the second cell includes displaying the first portion of the image in the first cell and the second portion of the image in the second cell.

15. The one or more computer-readable storage devices of claim 14, wherein the operations further comprise:
receiving, by the computing system, a fifth user input that manipulates a position of the image with respect to the first cell, and in response changing from presenting the first portion of the image in the first cell to presenting a third portion of the image in the first cell.

16. The one or more computer-readable storage devices of claim 9, wherein the operations further comprise:
displaying, by the computing system, a fourth user interface element that is to add a row or column of additional cells to the multi-dimensional grid of cells;

receiving, by the computing system, a fifth user input that selects the fourth user interface element that is to add the row or column of additional cells;

identifying, by the computing system, that the added row or column is to separate a fifth cell from a sixth cell across which content is not displayed;

identifying, by the computing system, that the added row or column is to separate a seventh cell from an eighth cell across which content is displayed before the fifth user input is received;

presenting, by the computing system, the multi-dimensional grid of cells with the row or column of additional cells added, including a display of:
- (i) a ninth cell, without user-specified content, added between the fifth cell and the sixth cell as a result of the computing system having identified that content is not displayed across the fifth cell and the sixth cell, and
- (ii) a tenth cell, including the content that is displayed across the seventh cell and the eighth cell, added between the seventh cell and the eighth cell.

\* \* \* \* \*